United States Patent [19]

Pulsifer

[11] 4,080,793

[45] Mar. 28, 1978

[54] METHOD AND APPARATUS FOR USING AUTOMOTIVE TIRES AS EARTH ENGINEERING DEVICES

[76] Inventor: Ernest K. Pulsifer, P.O. Box 772, Easton, Md. 21601

[21] Appl. No.: 566,822

[22] Filed: Apr. 10, 1975

[51] Int. Cl.² ............................................. E02B 3/12
[52] U.S. Cl. .......................................... 61/37; 61/3; 61/4; 61/38
[58] Field of Search ......................... 61/3, 4, 5, 37, 38, 61/1 R

[56] References Cited

U.S. PATENT DOCUMENTS

| 813,069 | 2/1906 | Levee | 61/37 UX |
| 1,332,655 | 3/1920 | Willard | 61/37 |
| 1,421,857 | 7/1922 | Store | 61/38 UX |
| 1,662,578 | 3/1928 | Kellner | 61/37 X |
| 3,234,741 | 2/1966 | Ionides | 61/38 X |
| 3,276,210 | 10/1966 | Stitt | 61/5 |
| 3,357,192 | 12/1967 | Hibarger | 61/5 |
| 3,374,635 | 3/1968 | Crandall | 61/38 |
| 3,386,252 | 6/1968 | Nelson | 61/37 |
| 3,597,928 | 8/1971 | Pilaar | 61/38 |
| 3,842,606 | 10/1974 | Stiles et al. | 61/3 |
| 3,855,801 | 12/1974 | Bernold | 61/45 R |

FOREIGN PATENT DOCUMENTS 1,398,975  4/1965  France .................................... 61/3

OTHER PUBLICATIONS

The Star-Democrat, Mar. 13, 1974, p. 8A.

*Primary Examiner*—Dennis L. Taylor
*Attorney, Agent, or Firm*—Cushman, Darby & Cushman

[57] ABSTRACT

An earth engineering device and method for manufacturing same for use in association with an earth-water interface to control and limit the erosion of earth therefrom. Both method and apparatus are disclosed for forming an ordered composite of structurally interconnected vehicular tire casings which are physically attached one to another and operatively disposed in association with the earth-water interface for controlling and limiting the erosion of earth therefrom.

26 Claims, 22 Drawing Figures

METHOD AND APPARATUS FOR USING AUTOMOTIVE TIRES AS EARTH ENGINEERING DEVICES

INVENTION

This invention relates generally to earth engineering devices as well as to methods and apparatus for constructing same. In particular, it deals with the use of vehicular tire casings as integral structural units in such an earth engineering device and to method and apparatus for interconnecting such tire casings and utilizing them most advantageously within such an earth engineering structure for controlling erosion from an earth-water interface.

The erosion of earth from an earth-water interface has long been recognized as a serious ecological problem. Natural wave actions at the earth-water interface have gradually eroded thousands of acres of shoreline over past years, thus destroying a great deal of valuable public and private property. Artificially induced wave action from sources such as fast traveling boats near the shoreline, etc., further compound the problem.

In general, such erosion often involves the washing away and undercutting of the bank at the earth-water interface eventually followed by the collapse of earth and vegetation overlying the undercut. The collapsed earth and vegetation is then also washed away by wave action followed by another cycle of undercutting and collapse, etc.

Such erosion processes as this not only destroy the available land area, they also substantially pollute the water medium and eliminate areas such as wetland marshes which normally act as natural filters and purifiers for water percolating therethrough. There is obviously also an adverse impact upon macroscopic and microscopic life both in the water and on the land.

It has been recognized in the past that such erosion processes can be controlled and limited by building structures generally aligned with the earth-water interface. Such structures in the past have been of types generally referred to as revetments, retaining walls, seawalls, shoring, jetties, groins, etc. The siting and placement of these general types of structures is well known in the art and does not need further description here. However, in the past, such structures have been constructed with relatively expensive materials and techniques, thus severely limiting their widespread application.

For instance, prior issued U.S. patents, such as U.S. Pat. Nos. 592,738; 1,971,324; 2,000,492; 2,138,037; 3,282,056; 3,466,874; and 3,728,862 show various retaining walls, bulkheads, seawalls, earth retainers, earth shoring means, etc., comprising structures formed of I-beams, form cast reinforced concrete, anchored cable, strips of sheet metal, corrugated steel, etc., which are not only expensive to construct but, in many cases, expensive to maintain. The construction techniques required for constructing many of such prior art earth erosion control structures at a shoreline are further complicated and made further expensive by the geography and usually existing environment of many shoreline areas which make it difficult if not impossible to economically utilize heavy machinery, to construct forms for casting concrete, etc.

Coexisting with this present problem of controlling and limiting erosion of earth-water interfaces is another environmental problem; namely, the disposal of used vehicular tire casings. Knowledgeable persons presently estimate that approximately 200,000,000 used automotive tire casings are discarded annually in the United States. Some of these discarded tire casings are usable for retreading or other recycling purposes. Most however (approximately 90%) are not presently employed for any useful purpose. Accordingly, the disposal of these tires presently presents a substantial economic and environmental problem. This problem is magnified by the fact that such tires are undesirable for use in normal landfill projects, etc., which are commonly used for disposing of many used items. The apparent reason for the refusal to use such tires in landfill projects is an inability to completely fill or compress the tires to any substantial degree, thus leaving the covered over ground with an undesirable resiliency unsuitable for any desirable end use. It has also often been observed that buried used tires spontaneously work their way to the top of a landfill project apparently in response to moisture, the natural earth crust vibrations, etc. Apparently, under the usual earth conditions, the net specific gravity of such buried tires is less than the specific gravity of the surrounding earth.

This invention provides a practical and economic method and apparatus for solving both of these existing environmental problem areas simultaneously; namely, with this invention, the used vehicular tire casings are physically attached one to another in a structurally sound ordered composite of interconnected tire casings which is operatively disposed in association with the earth-water interface for controlling and limiting the erosion of earth. The overall shape and function of the structure, when completed, will resemble conventional revetments, groins, and jetties, retaining walls, bulkheads, shoring structures, etc. However, this invention provides a unique and advantageous apparatus/method for forming such structures from ordered composites of structurally interconnected vehicular tire casings.

This invention will make the realization of such erosion control structures more practical and more economic, thus greatly increasing the likelihood of their use. At the same time, used vehicular tire casings which presently have a virtually negative value, may be economically utilized in quantities sufficient to substantially alleviate current disposal problems and increase the inherent worth and value of such vehicular tire casings providing an economic incentive for an ecologically sound disposal and utilization of such casings as provided by the teachings of this invention.

There have been some prior attempts to utilize used tire casings along shorelines for erosion control. Some such prior attempts are described, for instance, in Bulletin No. 6 on Shore Erosion in Tidewater Maryland published by the Maryland Board of Natural Resources in 1939. In general, such prior attempts are characterized by a random dumping of used tire casings along the shorelines and/or by loosely stacking such tire casings over piles driven at regular intervals along the shoreline. Other known prior attempts involve the use of a used tire casing as part of a concrete casting form which, when used in conjunction with mating forms, results in a concrete filled tire with a concrete core projecting upwardly to form a geometrical shape that may be conveniently fitted with other such concrete filled tires. In this instance, the tire is actually used as part of a concrete casting form and the resulting cast concrete block then forms a type of building block which may be used to form physical structures in a manner that might be analogized to the more conventional use of large rocks, concrete blocks, etc., or other commonly unitized building materials which are assembled on site to conventionally form structures such as revetments, etc.

However, so far as known, none of these prior attempts to utilize used vehicular tire casings in earth erosion structures has succeeded in a practical or commercial sense. Furthermore, none of these prior art structures involve an ordered composite of structurally interconnected vehicular tire casings which are physically attached one to another and operatively disposed in association with the earth-water interface for controlling and limiting the erosion of earth. This invention does provide such a structure formed substantially from an ordered composite of structurally interconnected tire casings and, at least in part, this novel feature of the invention constitutes a substantial and important improvement and advantage over prior art such as that discussed above.

Some of the objections that have been raised against the limited prior attempts to utilize vehicular tire casings for earth erosion control structures stem from the typical "eyesore" appearance of most prior art attempts. This is presumably because, in such prior art attempts, the tire casings themselves were exposed to view along the shorelines. Especially where the erosion control structures merely comprise a random dumping of tires or a loose stacking of the tires upon pilings, etc., such exposed tire casings are understandably viewed with disgust and disdain by local residents and ecologists alike.

Although this invention will make use of large numbers of used vehicular tire casings, special features are provided in this invention for substantially camouflaging and thus limiting the exposure of the tire casings per se. Accordingly, when the preferred embodiment of this invention is utilized, the only visible portion of the structure will appear as a natural vegetative growth, thus completely overcoming a very serious objection to earlier attempts to use such tire casings.

Still other features of this invention take advantage of the phenomenon whereby tire casings submerged within the soil naturally tend to rise toward the surface. By properly weighting a portion of the used tires utilized in an overall structure, the overall tendency of the structure to rise may be controlled to a desired amount so as to maintain the structure at its proper location with respect to the water and earth interface even if the earth portion of that interface should fall and rise subsequent to the installation of the structure because of other phenomena such as littoral deposits, etc. In this manner, a previously undesirable feature inherent in the used vehicular tire casings is put to ecological advantage.

This invention also includes a variety of fastening mechanisms for structurally and integrally interconnecting the tire casings one to another. The presently preferred embodiment of such interconnections includes an apparatus and method for deforming two adjacent tire wall sections into mating projected and depressed areas whereafter a pin or structure is forced through the deformed undulating wall segments. This preferred technique produces a large tire-to-tire contact surface area with substantial deformation forces existing over that area to maintain the tires connected in this manner in an integral and structural fashion. Furthermore, special hook and/or eye portions of the connection pin may be conveniently utilized for attaching one planar array of interconnected tires with an overlying or underlying planar array of connected tires.

Groups of interconnected used vehicular tire casings have been used in the past as artificial reefs for the attraction of fish and other underwater life. See, for instance, the publication entitled "Scrap Tires as Artificial Reefs", Report No. SW-119 published by the U.S. Environmental Protection Agency in 1974. Other offshore uses of interconnected used vehicular tire casings have also been suggested, such as, for instance, a breakwater in U.S. Pat. No. 3,276,210 issued to Stitt in 1966. However, such structures are not designed for erosion control and/or are not suited for major earthbound construction structures such as contemplated by this invention. Furthermore, such structures as these formed from vehicular tire casings for various purposes have usually involved interconnection of the tires in a more conventional manner such as by nuts and bolts, embedding within a common block of cast concrete, etc.

It is also known that certain prior art retaining walls and revetments have involved terraced constructions providing areas along each terrace level for the planting of vegetative matter. Such prior revetments and retaining walls are shown, for instance, in U.S. Pat. Nos. 647,322 and 2,911,794. However, the construction techniques involved in constructing such retaining walls are thought suitable only for relatively light construction and involve the performing and/or casting of more conventional building material and to specialized predefined shapes, etc.

All these and other advantages and objects of this invention will be more clearly understood from the following detailed description of the invention taken in conjunction with the accompanying drawings, of which.

Figures 1, 2:
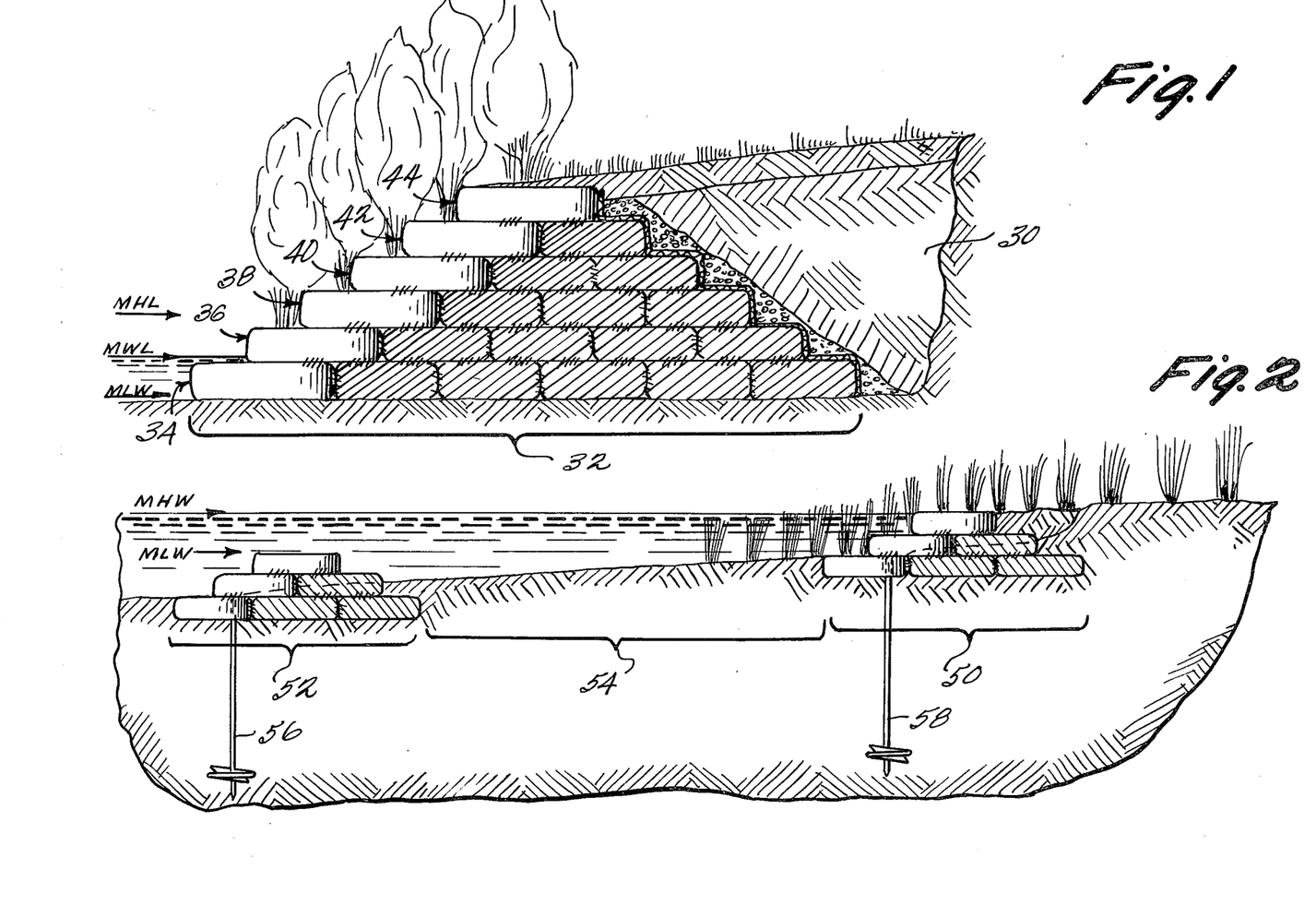
FIG. 1 is a cross-sectional view of one exemplary embodiment of this invention showing a flower pot revetment planted with vegetative matter on the waterward side.
FIG. 2 is a cross-sectional view of another exemplary embodiment of this invention comprising two spaced apart revetment structures along a shoreline with a wetland marsh area thereby being defined between the two revetment structures for collection of the littoral drift and to provide natural filtering and purification of water circulating therethrough, etc.

Referring to FIG. 1, a typical exemplary embodiment of this invention is shown in cross section. The existing eroded shoreline is shown at 30. A revetment structure 32 is disposed in general alignment with the earth bank-water interface. As shown in FIG. 1, the revetment 32 comprises an orderly array of vehicular tire casings having a vertical dimension extending vertically as shown in the drawing, and a horizontal dimension extending into and out of the plane of the drawing in substantial alignment with the earth-water interface. The vehicular tire casings shown in FIG. 1 are schematically drawn in cross section as rectangles without including all of the detailed conventional side wall and tread wall tire construction features. In addition, means are included in the embodiment of FIG. 1 for physically interconnecting the casings in both the vertical and horizontal dimensions of the array to form a structure for controlling and limiting the erosion of earth from the interface. As shown in FIG. 1, the means for interconnecting are schematically shown as groups of short lines passing between the boundaries of adjacent tire walls.

It may also be seen in FIG. 1 that the ordered array of vehicular tire casings actually comprises a plurality of planar arrays 34, 36, 38, 40, 42 and 44 all extending in horizontal dimensions while the planar arrays are layered on top of one another vertically in a vertical dimension. Furthermore, the planar arrays shown in FIG. 1 are offset with respect to each other in a direction perpendicular to the earth-water interface, thus forming a step-shaped cross section at the waterward side.

The tire casings shown with cross hatching in FIG. 1 are substantially filled with a ballast material such as cement. It is contemplated that this filling would be placed within the tire casings on the site such as by pumping liquid Portland cement, etc., thereinto and thereafter permitting it to harden. The interstices between the tires may also be filled with ballast material if desired. For convenience, and for added ballast, such a filling in the interstices might well be desired. Furthermore, after hardening, the cement or the ballast material would further act to interconnect the tire casings one to another. While the tire casings shown in cross section in FIG. 1 thus may very generally constitute a type of cement casting form, it should be appreciated that such a casting form is constructed substantially entirely from the tire casings which have been interconnected one with another. Furthermore, the structure and method of forming the structure are particularly adaptable for on-site construction techniques in the usual earth-water interface environment and the tires are not utilized individually as casting forms but, rather, integrally as a whole interconnected structural apparatus.

As shown in FIG. 1, the tire casings on the water side of the array located above the water-earth interface have a soil filling. Typically, the soil filling might actually comprise a mixture of soil and stone and would be particularly adapted for the type of vegetative material it is desired to grow therewithin. A combination of grasses and shrubbery is shown in FIG. 1 as planted in the "flower pots" provided by the initially exposed center areas of the tire casings on the water side of the array. As should not be appreciated, the vegetative material growing upon and within the soil filling camouflages the exposed parts of the array with the exposed portions of the vegetative matter and interconnects the filled casings with the root structures of the vegetative matter. A soil filler material (poly filter X) is preferably placed over the earth facing side of the array as shown in FIG. 1. Thereupon, a crushed stone or other draining mixture is placed in the remainder of the area between the array and the existing shoreline and/or this area is filled, graded, topped off with top soil and planted as desired.

As should now be apparent, the embodiment shown in FIG. 1 is formed from long lasting materials and should last virtually indefinitely. Furthermore, although there will be some initial exposure of the tires on the water side of the array, the entire array will soon become virtually invisible after a short time due to the soil filling and the vegetation planted within the "flower pots" naturally formed in the tires on the water side of the array. Furthermore, the revetment structure shown in FIG. 1 is perfectly safe with respect to water navigation since there will be no major or permanent damage to the boats or other objects hitting the water side of the revetment or, in any event, there would be no greater damage expected than would be the case if such boats were to strike normal land-water interfaces.

The embodiment shown in FIG. 2 comprises a first revetment structure 50 constructed in a manner similar to that already described with respect to FIG. 1. In addition, the second orderly array of vehicular tire casings 52 forms a second revetment structure which is displaced from the first revetment 50. The second array also has a plurality of casings in both vertical and horizontal dimensions with its horizontal dimension also being disposed in substantial alignment with the earth-water interface and having the casings interconnected in both the vertical and horizontal dimensions to thus form a second revetment structure and to define a marshland area 54 between the two revetment structures wherein littoral drift deposits are accumulated to reclaim already eroded land area and to further control the erosion at the earth-water interface area.

As shown in FIG. 2, the topmost portion of the revetment structure 52 which is outermost situated towards the water is lower than the topmost portion of the innermost situated revetment structure 50. It is also noted that the topmost portion of the outermost structure 52 is substantially disposed at the mean low water level while the topmost portion of the innermost structure 50 is substantially disposed at the mean high water level. As can now be appreciated, this substantially facilitates the deposit of littoral drift within the wetland marsh area 54 while preventing any further erosion from the preexisting shorelines, etc. Accordingly, this embodiment should enable the rebuilding and reestablishment of wetland marsh areas which have long ago been lost to the erosion processes.

As in the earlier discussed embodiment, the earth engineering apparatus comprising the revetment structure 50 and the revetment structure 52 are each in contact with the earth and some of the earthbound tire casings contain a ballast filling such as Portland cement pumped thereinto in a virtually liquid state and thereafter permitted to harden. In addition, screw anchors 56 and 58 are provided at intervals along each of the revetment structures 52 and 50, respectively, to help fix the lateral position of the revetment structures. The entire revetment structure per se would still be permitted to take advantage of the natural forces tending to cause buried tire casings to rise provided that the amount of ballast material is limited to a predetermined amount so as to retain a predetermined tendency for the entire array to remain at the desired position towards the upper limit of the earth-water interface by controlling the utilization of these natural forces which tend to cause buried tire casings to rise. Accordingly, as the littoral drift begins to shore up the wetland marsh area created between the two revetment structures 52, the outermost revetment structure, if properly designed, could be expected to rise sufficiently to retain the accumulated littoral drift and to enhance the further collection thereof.

Figure 3:
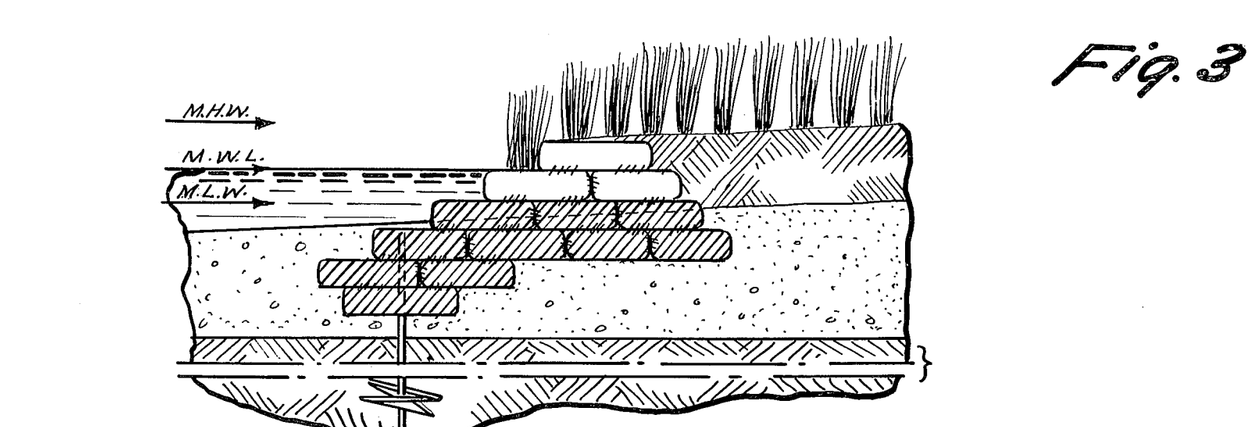
FIG. 3 is a cross-sectional view of still another exemplary embodiment of this invention showing an offshore revetment planted with grasses and designed to re-establish a shoreline out beyond an existing eroded shoreline.

In the embodiment shown in FIG. 3, it should be noted that the revetment structure shown there has actually been placed offshore with respect to the existing eroded shoreline. Accordingly, those tire casings on the water side and below the mean water level have been filled with ballast such as cement placed therein as previously described. In addition, in the embodiment shown in FIG. 3, the revetment structure is placed upon and within beach sand. An anchor screw is provided and structurally interconnected with at least some of the ballast filled casings and disposed within the mass of more consolidated earth therebelow to effectively anchor the array to a desired predetermined location. Water passing through the nonballast filled tires would be slowed considerably, thus enhancing the accumulation of littoral deposits both within the nonballast filled tire casings of the revetment structure shown in FIG. 3 and therebeyond toward the earth side, thus reestablishing the shoreline to regain some of the land barrier earlier lost through erosion processes. Of course, if desired, the shoreline can be immediately established by filling operations. In any event, once established, either through natural or manual seeding, appropriate grasses and other vegetative material should be encouraged to grow, thus camouflaging the initially exposed portions of the revetment structure.

Figure 4:
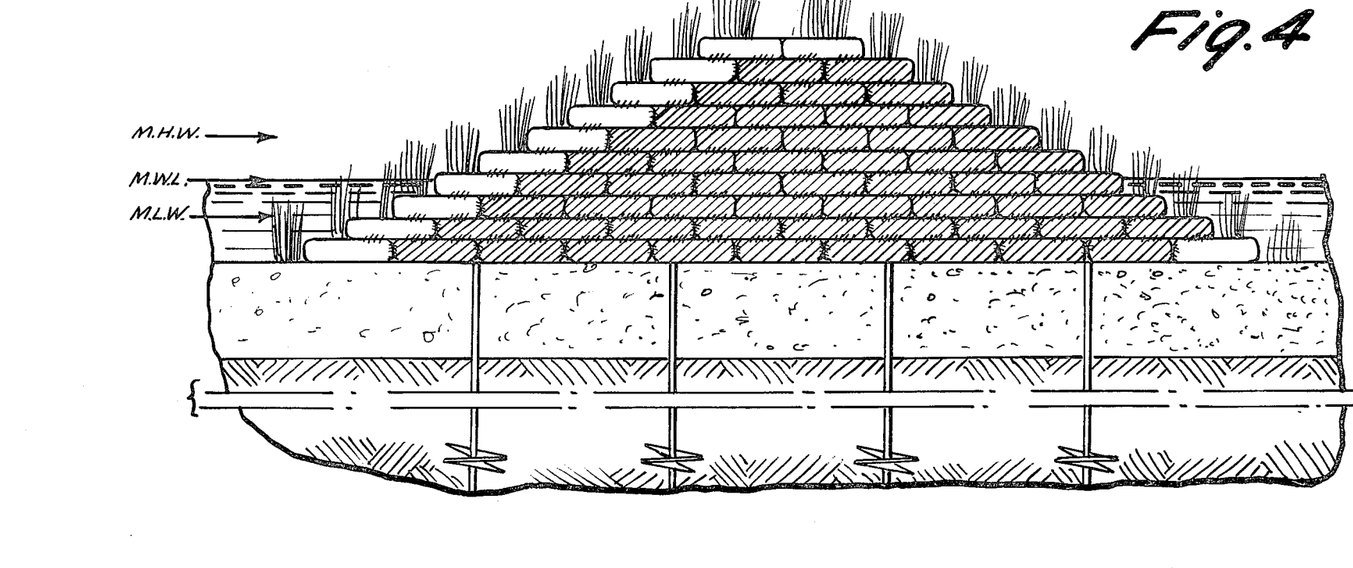
FIG. 4 is a cross-sectional view of still another exemplary embodiment of this invention showing a massive bay groin structure planted with spartina grasses.

The construction of the massive groin shown in FIG. 4 is substantially self-explanatory in view of the earlier discussion of the embodiments shown in FIGS. 1, 2 and 3. As before, the groin is formed from an orderly array of vehicular tire casings comprising a plurality of planar arrays extending both in horizontal dimension substantially aligned with an earth-water interface and wherein the planar arrays are layered on top of one another vertically in a vertical dimension and offset with respect to each other to form a step-shaped cross section at the earth-water interface. As before, the tire casings are interconnected in both the vertical and horizontal dimensions of the array one with another to form a structure for controlling and limiting the erosion of earth. As before, the outermost tires in the structure are not filled with ballast but, rather filled with a soil or soil and rock mixture and have vegetative material growing therein to both camouflage the outward appearance of the groin and to help internally connect the outermost tire members via the root structure of the vegetative material. Furthermore, some of the ballast filled tires are structurally connected with anchors extending down into the mass of the underlying earth.

Figure 5:
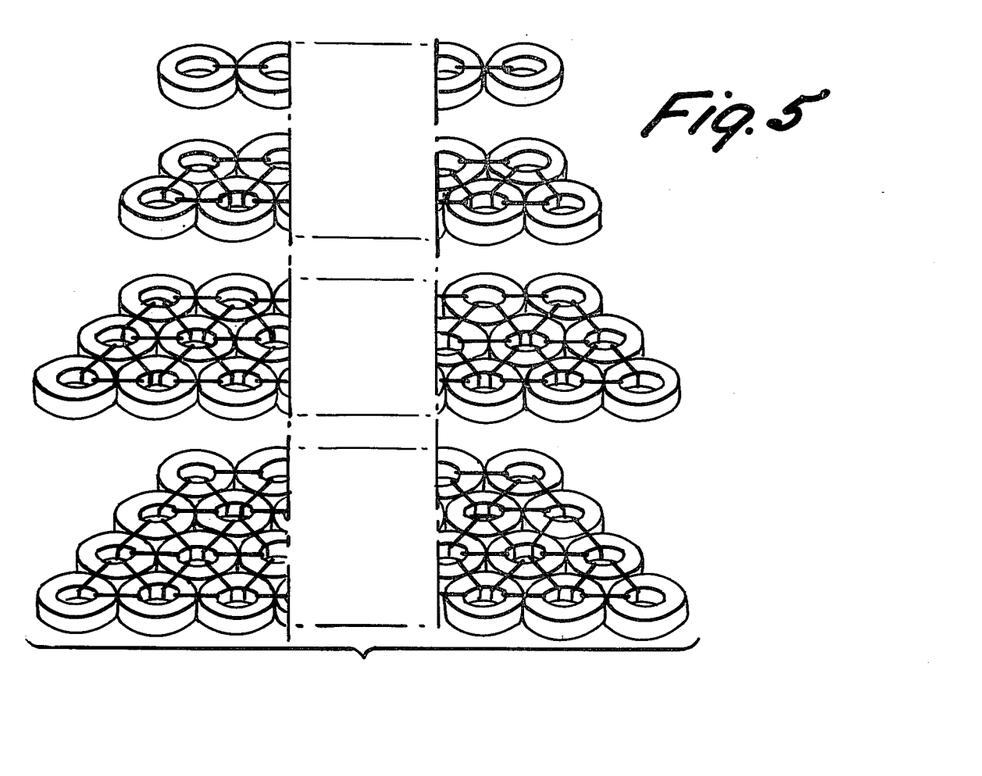
FIG. 5 is a cutaway exploded pictorial view of several planar arrays of tires interconnected one with another such as might be utilized in forming the various exemplary embodiments of this invention shown in more detail in other FIGURES.

One exemplary technique for interconnecting the tires one with another is pictorially illustrated in FIG. 5; namely, the banding of adjacent tire walls with polyethylene bands. As shown in FIG. 5, several planar arrays are comprised of individual tires bound one to another with such polyethylene bands in a so-called three-point contact configuration. Similar banding techniques may be utilized for connecting the planar arrays in a vertical dimension. It is estimated that when the three-point contact structure shown in FIG. 5 is utilized and the interstices are filled with cement, the overall structure has a shear strength which approximates 20% of the shear strength of the concrete by itself. If a four-point construction structure is utilized, the shear strength increases to approximately 90% of the shear strength of the concrete by itself. The banding interconnections between the tires shown in FIG. 5 are solely for illustration and other connection techniques are actually preferred in this invention, as will be discussed later.

Figure 6:
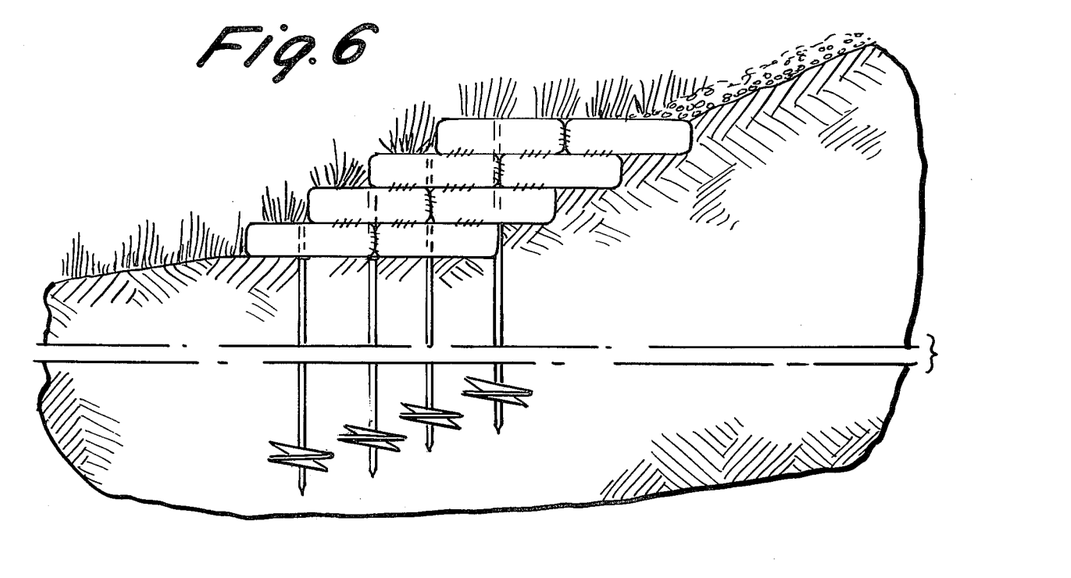
FIG. 6 is a cross-sectional view of yet another exemplary embodiment of this invention as a low profile revetment.

The exemplary structure shown in FIG. 6 comprises a plurality of staggered planar arrays with the entire structure comprising vehicular tire casings that are interconnected one with another in an integral and structurally engineered sound manner. However, none of the tires shown in the structure in FIG. 6 is filled with ballast. Accordingly, in this embodiment, maximum advantage is taken of the natural forces tending to cause the buried tire casings to rise. The lateral position of the structure is maintained by anchors as shown in FIG. 6. As with the other embodiments, the outermost initially exposed tires in the structure form "flower pots" within which grasses and/or other vegetative material is planted to camouflage the structure.

Figure 7:
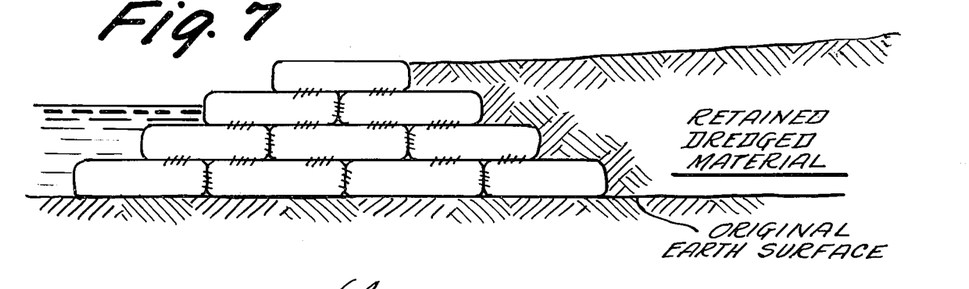
FIG. 7 is a cross-sectional view of a special exemplary embodiment of this invention such as might be utilized for containing dredged material from the bottom of a body of water.
Figure 8:
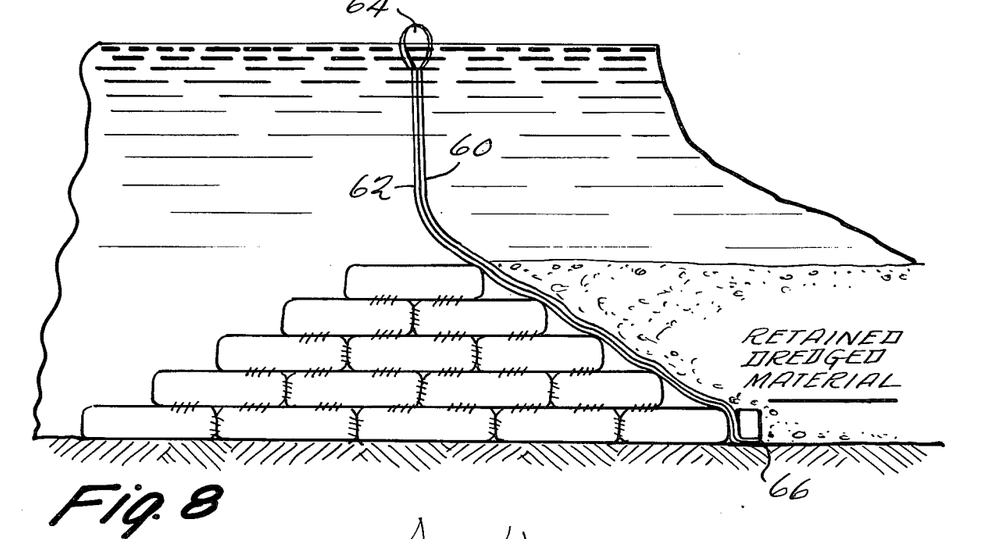
FIG. 8 is another exemplary embodiment of this invention which might be constructed under water for retaining dredged material from other underwater areas.

The embodiments shown in FIGS. 7 and 8 are actually utilized in an indirect manner for controlling the erosion of earth material; namely, they are structures particularly suited for the retaining of dredged material from the bottom of a water body. By thus retaining the dredged material, it is prevented from returning to the bottom area from which it was dredged. The structure shown in FIG. 7 is for use above water and comprises nonballast filled structure of used tires interconnected one with another to form a retaining wall. The lateral position of the retaining wall is retained by the anchors passing into the mass of earth as shown in FIG. 7.

A similar structure is shown in FIG. 8 except for the fact that the central portion of the structure has been filled with ballast as indicated and the entire structure is located beneath the water surface. In addition, to prevent pollution of the surrounding water area, a poly filter cloth 60 and a backing fishnet or similar material 62 are extended along the inside of the retaining wall up to the water surface. The lower edge of this fishnet and filter cloth combination is retained at the lower inside edge of the retaining wall by weight 66 while the upper edge of the fishnet and filter cloth combination is maintained at the top of the water level by means such as a float 64. With this structure, dredged material may be deposited within the inside of the retaining wall and maintained therewithin without polluting the surrounding water.

Figure 9:
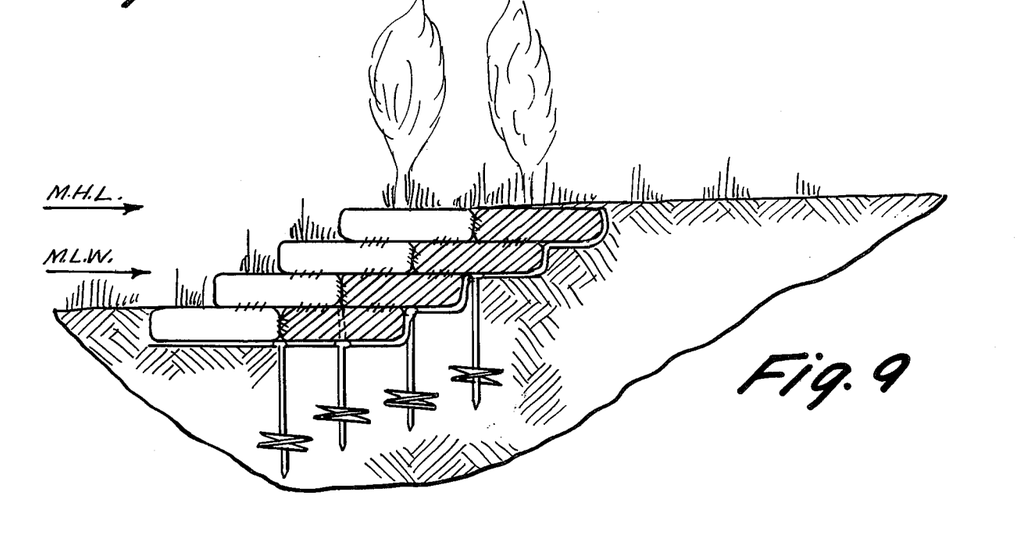
FIG. 9 is a cross-sectional view of an exemplary embodiment similar in some ways to that shown in FIG. 6.
Figure 10:
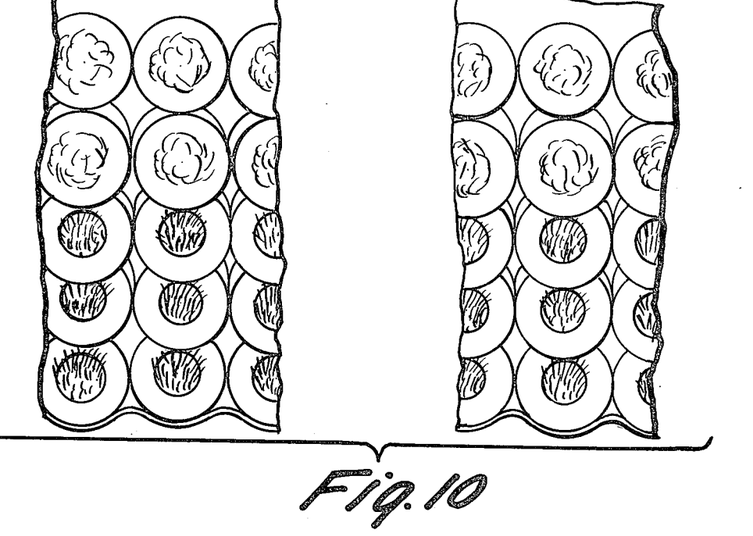
FIG. 10 is a partial cutaway top view of the exemplary embodiment shown in FIG. 9.
Figure 11:
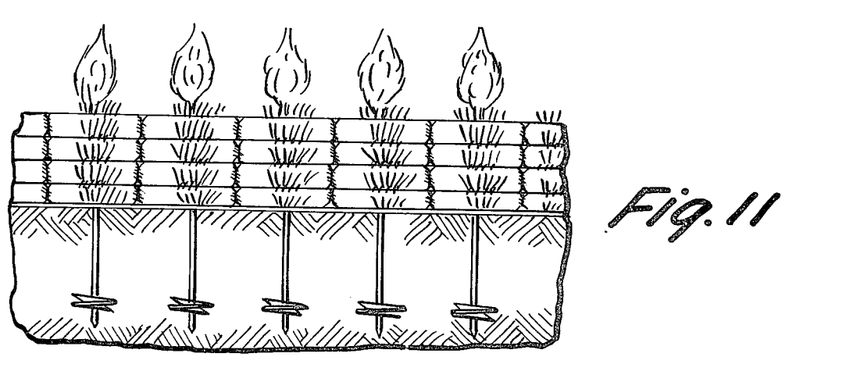
FIG. 11 is a partial cutaway front view of the embodiment of FIG. 9 looking from the water toward the earth side of the earth-water interface.

FIGS. 9, 10 and 11 show a cross-sectional, partial top and partial front view respectively, of an embodiment of this invention quite similar to that shown in FIG. 6. However, the embodiment shown in FIGS. 9-11 has some of the lower and earthbound tire casings filled with ballast material, thus inhibiting to some degree the natural forces tending to cause the buried tire casings to rise. In this embodiment, the revetment structure extends up to the mean high water level to substantially prevent any further erosion from the shoreline thus protected. In addition, the outer initially exposed tires inherently form a type of "flower pot" arrangement which is soil filled by manual filling operations or natural littoral deposits, etc., and then planted with grasses, shrubbery, etc., as shown in FIGS. 9-11 to camouflage the revetment structure.

Figure 12A:
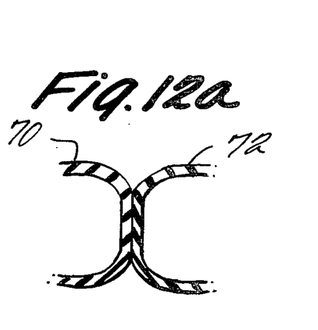
FIGS. 12a, 12b and 12c show a sequence of steps involved in a preferred embodiment for interconnecting the walls of adjacent tires by deformation and pinning.
Figure 12B:
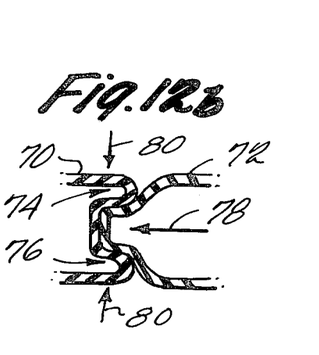
Figure 12C:
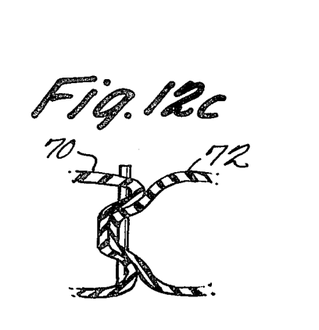

The preferred interconnection of the tire casings with one another for use in the various embodiments of this invention already discussed involves a deformation and pinning process which is graphically illustrated in FIGS. 12a, 12b and 12c. As shown in FIG. 12a, the walls of a first tire 70 and a second tire 72 are placed adjacent one another. As shown in FIG. 12a, the tread walls of the tires 70 and 72 are placed adjacently although, as should be appreciated, it would also be possible to adjacently position side walls of two tires or a side wall and a tread wall portion of two separate tires, etc. In any event, two walls of two corresponding tires 70 and 72 are initially placed adjacent one another as shown in FIG. 12a.

Thereafter, these adjacent tire walls are deformed in a manner such as that shown in FIG. 12b. In particular, this type of deformation is preferably achieved by applying force to both adjacent walls in a first direction at two spaced apart areas 74,76. In addition, force is applied to both of the adjacent walls in a second substantially opposite direction at an intermediate area 78, thereby deforming the adjacent walls into complementary depressed and projecting areas as compared to the normal state of the tire walls. When seen in cross section as in FIG. 12b, the tire walls present undulating contacting dual wall areas therebetween. A pin is then passed through these undulating wall areas at a position such as that shown by the arrows 80 to result in a pinned structurally integral and interconnected pair of tires 70,72 as shown in FIG. 12c. It has been discovered that this particular interconnection structure may be conveniently achieved by the method just described and with apparatus to be described hereafter, and that it provides a particularly strong and integral connection between two adjacent tire walls since a relatively large area of the two adjacent tire walls is maintained in intimate and forceful deformed contact by the pin, thus providing a substantially rigid connection between the two tires 70,72.

The inner connecting pins may be utilized for interconnecting the tires into planar arrays previously discussed. In addition, the pins might also be used in a similar manner for interconnecting adjacent side walls of the tires and thus connecting the tires in a vertical direction and coupling the planar arrays in a vertical direction.

Figure 13:
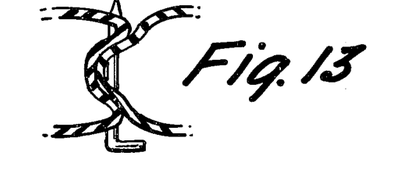
FIG. 13 is a cross-sectional view of a deformed and pinned pair of tire walls showing a particular type of connection pin.
Figure 14:
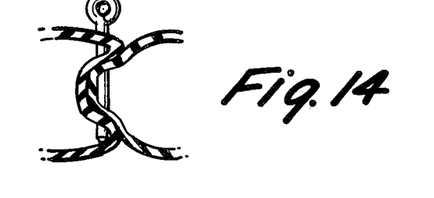
FIG. 14 is another cross-sectional view of deformed and pinned adjacent tire walls showing yet another possible type of connecting pin structure.

However, if the pins are provided with hook and/or eye or eyelet type of pins as shown in FIGS. 13 and 14 respectively, then the interconnection in the vertical direction may be made by actually interconnecting the pins such as by interconnecting the hooks of one planar array with the eyelets of another planar array, thereby or therebelow as the case may be. Furthermore, the type of hook pin shown in FIG. 13 is particularly adapted to the engagement of the lip of a side wall of the tire in an immediately underlying or overlying planar array of tires by simply rotating the hook portion over the lip of the underlying or overlying side wall.

Figure 15:
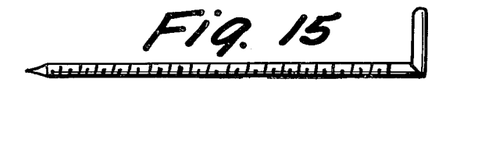
FIG. 15 is a more detailed view of the interconnecting pin shown in FIG. 13.

As shown in FIG. 15, the hook ended pin of FIG. 13 might, in fact, comprise the usual type of lag screw structure where the treads on the lag screw are useful in helping to prevent unintentional dislodging of the pin by physically engaging the tire casing when in place. Of course, machine threaded pins and a threaded nut assembly or other conventional means might also be utilized for preventing the pin from unintentionally being dislodged once it is in place.

Figures 16, 17, 18, 19, 20:
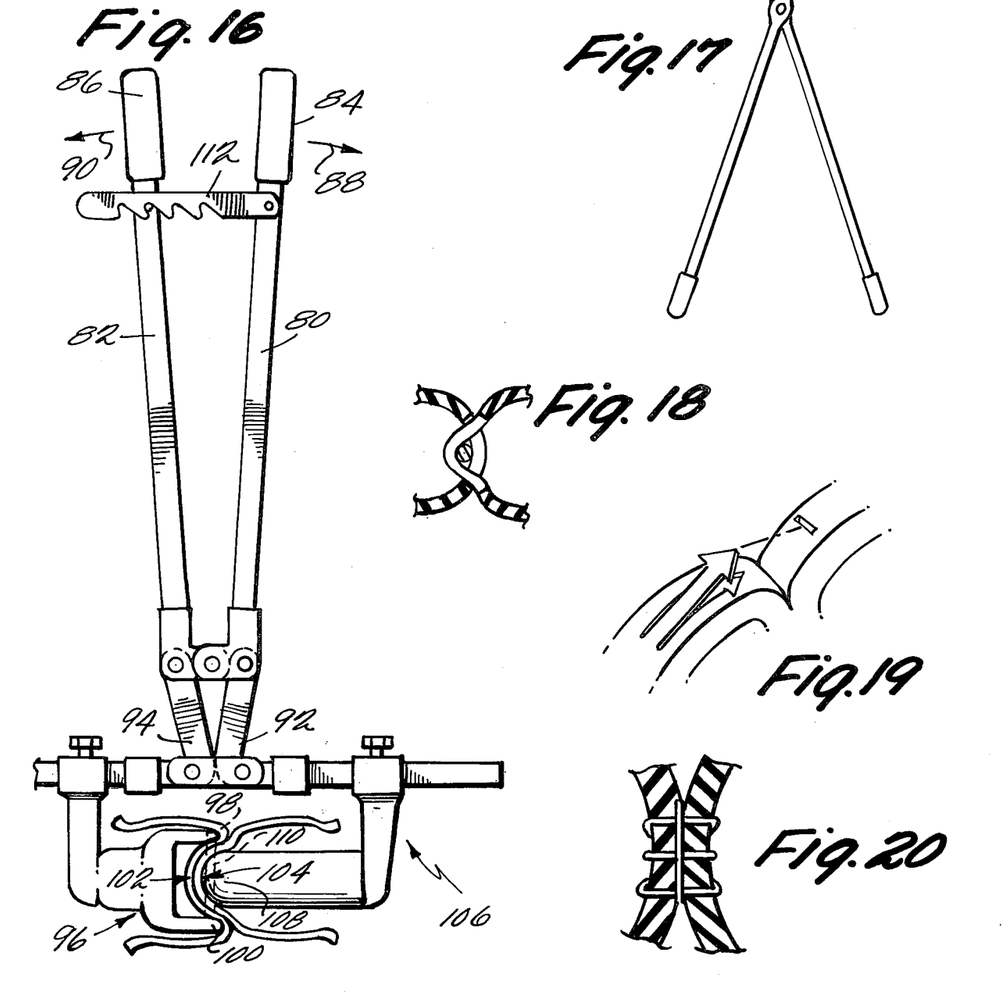
FIG. 16 is a pictorial view of an exemplary embodiment of apparatus that might be used for deforming and pinning adjacent walls of the tires in the manner shown in FIGS. 12-14.
FIG. 17 is another exemplary embodiment of apparatus for deforming and pinning adjacent tire walls as shown in FIGS. 12-14.
FIG. 18 is a cross-sectional view of yet another exemplary embodiment for interconnecting the tires through a combination of slitting and pinning.
FIG. 19 illustrates yet another exemplary embodiment for interconnecting adjacent tires involving the use of cut slots and mating tabs in the adjacent side walls.
FIG. 20 is a cross-sectional illustration of yet another exemplary embodiment for interconnecting adjacent side walls of the tires utilizing a double-faced gang nail plate.

An illustrative nonlimiting example of apparatus that could be used for deforming and pinning adjacent tire walls as described with respect to FIGS. 12a–12c is shown in FIG. 16. Here, there are two mutually pivoted operating levers 80, 82 having free ends 84, 86 respectively, to which forces may be applied in the direction of arrows 88 and 90, respectively, for operating the apparatus and performing the deformation and pinning operations previously discussed. For instance, as shown in FIG. 16, the forces applied at 88 and 90 are transmitted to the opposite operating ends 92 and 94 respectively of the levers. The operating end 94 has attached thereto an apparatus generally indicated at 96 which includes spaced apart projections 98,100 for applying force to both of the adjacent walls 102,104 of two tires at two spaced apart areas corresponding to the projections 98,100.

The other operating end 92 has attached to it apparatus generally indicated at 106 including a projection 108 disposed intermediate the spaced apart projections 98,100 for applying force to both of the adjacent walls in a second direction substantially opposed to the force applied by the other apparatus 96 and at an intermediate area as should now be apparent. Accordingly, when forces are applied at 88,90, the adjacent walls of the tire members are deformed into complementary depressed and projected areas compared to the normal state of the tire casing.

In addition, an aligned aperture 110 is provided in association with both of the projections 98,100 and the projection 108 thus defining a path through which a pin may be passed through both the depressed and projected areas of this deformed side wall, thereby structurally interconnecting the vehicular tire casings in the manner earlier described with respect to FIGS. 12a–12c. The pin may either be forcefully passed through the tire walls or, if desired, a pilot hole may first be formed such as by drilling before the pin is passed through the deformed side wall members.

As shown in FIG. 16, there is also a ratchet holding bar 112 located between the lever arms 80,82 for maintaining the deformed position of the tire walls while the pinning process is under way.

Another exemplary illustrative nonlimiting example of apparatus for performing the deformation in pinning process is shown in FIG. 17. This apparatus more closely resembles a scissors type of arrangement wherein the operating levers are moved toward one another to deform the tire. As before, the operating ends of the lever include means for applying force at spaced apart areas and at an area intermediate the two spaced apart areas for deforming the tire and also include means for defining a path through which the pin may be passed in the vastly deformed tire walls.

The deformation and pinning interconnection of the tires is presently preferred over other interconnection techniques because of the relative strength, ease of assembly, and the facility with which layers or planar arrays of interconnected tires may be interlocked and because this technique results in a rather minimal overall deformation of the tire roundness. However, there are other interconnection techniques that may be utilized, if desired, for interconnecting the tires one with another in the various erosion control structures previously described.

One such alternate interconnection structure has already been discussed with respect to FIG. 5; namely, banding with polyethylene bands. Another alternate embodiment is shown in FIG. 18 wherein tread walls of the tires are slit and then pinned. In particular, the slits are formed in mating alternate areas of adjacent tire walls as shown in FIG. 18 and a pin is then passed alternately on one side and then another of the adjacent tire walls of the configuration to thus connect the two tires.

Another embodiment is shown in FIG. 19 wherein use is made of mating slots and tabs in adjacent walls of the casings. A slot is formed in one casing while a tab such as the arrow shaped tab shown in FIG. 19 is cut from an adjacent wall. The tab is then fitted within the slot and, because of the relative dimensions of the tab (or at least the head portion of the arrow shaped tab) and the slot, the tab is retained within the slot once inserted.

Still another alternate interconnection embodiment is shown in FIG. 20 wherein a double faced gang nail plate is interposed between the adjacent side walls of the casings. Suitable means such as opposing hammers, etc., are then utilized for simultaneously forcing the side walls down about the opposingly projected nails while at the same time bringing the nails back upon the side walls to retain them in place thereabout as shown in FIG. 20.

Other interconnection techniques might also be possible. For instance, large staples or rivets might be used. Nylon rope might be utilized and even steel banding might be utilized in combination with a cementitious material such as an epoxy glue or a penetration asphalt material. It should also be apparent that the various alternate interconnection devices might be utilized in combinations as desired.

While only a few specific exemplary embodiments of this invention have been described in detail in the foregoing specification, those in the art will recognize that other modifications and variations of the exemplary embodiments are possible without materially departing from the spirit and broader novel teachings of this invention. Accordingly, all such modifications and variations are intended to be included within the scope of this invention as defined by the appended claims.

In particular, according to this invention, the earth engineering devices and/or methods for manufacturing same as described above may be utilized in association with earth, soil and soil-like materials, water, water suspended or transported materials and/or supported fauna and flora, earth-wind, earth-water, water-wind, water, water movement, etc., on, in or at earth, water, or interfaces thereof to control, limit, enhance, or obstruct the movements, intensities, and/or inter-reactions therefrom. Both methods and apparatuses are disclosed for forming an ordered composite of structurally interconnected vehicular tire casings which are physically attached one to another, with or without the incorporated use of other materials, and operatively disposed in association with the earth, water, wind, and movements thereon, therein, and thereof with respect to these substances per se and/or with respect to interfaces of such substances in any combination for controlling, limiting, enhancing, or obstructing movements of such substances.

As examples of applications included in the above description, it is noted that the earth engineering devices and materials of this invention will find application for erosion control, dune stabilizers, flood control, siltation (e.g., dredged material) basins, dikes and retaining walls, erosion reclamation, shoreline reclamation, shoreline extension, manmade island construction, groins and jetties, channel siltation control, sea walls and harbor protection structures, fishing reefs, safety barriers, hazard protection for recreational area, wildlife and domestic life control devices and environmental improvement structures for enhancement of finfish, shellfish and other natural life.

What is claimed is:

1. An earth engineering apparatus comprising:

a plurality of vehicular tire casings arranged in a plurality of planar arrays extending in a substantially horizontal dimension, said planar arrays being layered on top of one another in a substantially vertical dimension whereby each of said casings is in contacting relationship with at least one other casing within its respective planar array and with at least one other casing within an adjacent layered planar array;

means for interconnecting said casings in both the vertical and horizontal dimensions, said interconnecting means comprising pins projecting through apertures provided in mating deformations of the casings at said contacting locations;

said mating deformations including an inwardly directed deformation of one casing and a mating outwardly directed deformation of an adjacent contacting casing; and each of said pins including a shank portion and a hook portion, said casings being interconnected in the horizontal dimension by said shank portions projecting through said mating deformations of the casings and being interconnected in the vertical direction by interengagement of the hook portions of the pins which interconnect in the horizontal dimension casings in adjacent layered planar arrays.

2. An earth engineering apparatus comprising:
a plurality of vehicular tire casings arranged in a plurality of planar arrays extending in a substantially horizontal dimension, said planar arrays being layered on top of one another in a substantially vertical dimension whereby each of said casings is in contacting relationship with at least one other casing within its respective planar array and with at least one other casing within an adjacent layered planar array;
means for interconnecting said casings in both the vertical and horizontal dimensions, said interconnecting means comprising pins projecting through apertures provided in mating deformations of the casings at said contacting locations;
said mating deformations including an inwardly directed deformation of one casing and a mating outwardly directed deformation of an adjacent contacting casing; and
each of said pins including a shank portion and a hook portion, said casings being interconnected in the horizontal dimension by said shank portions projecting through said mating deformations of the casings and being interconnected in the vertical direction by the hook portions engaging the casings of adjacent layered planar arrays.

3. An earth engineering apparatus comprising:
a plurality of vehicular tire casings arranged in a plurality of planar arrays extending in a substantially horizontal dimension, said planar arrays being layered on top of one another in a substantially vertical dimension whereby each of said casings is in contacting relationship with at least one other casing within its respective planar array and with at least one other casing within an adjacent layered planar array; and
means for integrally interconnecting said casings in both the vertical and horizontal dimensions including plural horizontal connecting means distributed horizontally throughout each of said planar arrays positively locking the tire casings therein one to another at their points of respective contact within each such planar array and plural vertical connecting means distributed horizontally throughout the interface between each pair of adjacent vertically layered planar arrays positively locking one planar array to adjacent planar arrays throughout the entire earth engineering apparatus.

4. An earth engineering apparatus as in claim 3 further comprising no more than a predetermined ballast within said tire casings to provide means for counteracting natural forces tending to cause said casings to be displaced.

5. An earth engineering apparatus as in claim 3 wherein at least some of said planar arrays are offset with respect to adjacent planar arrays forming a steplike arrangement at the extremities of the corresponding planar arrays.

6. An earth engineering apparatus as in claim 5 further comprising:
a soil filling disposed in at least some of the tire casings; and
vegetation growing upon and within said filling to camouflage exposed portions of said arrays and to provide root structures for assistance in interconnecting said casings.

7. An earth engineering apparatus as in claim 3 wherein said apparatus is positioned at an earth-water interface to control and limit erosion of earth therefrom.

8. An earth engineering apparatus as in claim 7 further comprising a ballast filling disposed in at least some of the tire casings below the expected water level, a soil filling disposed in at least some of the casings above the expected water level, and vegetation growing upon and within said soil filling to camouflage exposed portions of said arrays and to provide root structures for assistance in interconnecting said casings.

9. An earth engineering apparatus as in claim 5 wherein each of said planar arrays has substantially no more casings than the planar array located directly therebelow.

10. An earth engineering apparatus as in claim 5 further comprising a ballast filling disposed in at least some of the tire casings disposed in contact with the earth.

11. An earth engineering apparatus as in claim 10 further comprising:
anchor means structurally interconnected with at least some of said ballast filled casings and disposed within the mass of the earth to effectively anchor said apparatus to a desired predetermined location.

12. An earth engineering apparatus as in claim 7 further comprising:
filter cloth means disposed on the earth side of said array for filtering liquids passing therethrough.

13. An earth engineering apparatus as in claim 7 further comprising:
a second orderly array of vehicular tire casings, said second array having a plurality of casings in both vertical and horizontal dimensions and being disposed with said horizontal dimension also substantially aligned with said interface and displaced from said first-mentioned array, and
means for interconnecting the casings in said second array in both the vertical and horizontal dimensions to form a second structure defining a marshland area between said structures where littoral drift deposits are accumulated to reclaim land area and to further control erosion of said earth.

14. An earth engineering apparatus as in claim 13 wherein the topmost portion of the structure outermost situated towards the water is lower than the topmost portion of the innermost situated structure.

15. An earth engineering apparatus as in claim 14 wherein said topmost portion of the outermost structure is substantially disposed at the mean low water level of said water.

16. An earth engineering apparatus as in claim 3 further comprising a ballast filling within at least some of said tire casings.

17. An earth engineering apparatus as in claim 16 wherein said ballast filling comprises a cement material which is hardened in place.

18. An earth engineering apparatus as in claim 3 further comprising a ballast filling between at least some of said tire casings within the interstices therebetween.

19. An earth engineering apparatus as in claim 18 wherein said ballast filling comprises a cement material which is hardened in place.

20. An earth engineering apparatus as in claim 3 further comprising a ballast filling within and between at least some of said tire casings.

21. An earth engineering apparatus as in claim 20 wherein said ballast filling comprises a cement material which is hardened in place.

22. An earth engineering apparatus comprising:
a plurality of vehicular tire casings arranged in a plurality of planar arrays extending in a substantially horizontal dimension, said planar arrays being layered on top of one another in a substantially vertical dimension whereby each of said casings is in contacting relationship with at least one other casing within its respective planar array; and
means for integrally interconnecting said casings in both the vertical and horizontal dimensions, said interconnecting means comprising pins projecting through apertures provided in mating deformations of the casings at said contacting locations and including plural horizontal connecting means distributed horizontally throughout each of said planar arrays positively locking the tire casings therein one to another at their points of respective contact within each such planar array and plural vertical connecting means distributed horizontally throughout the interface between each pair of adjacent vertically layered planar arrays positively locking one planar array to adjacent planar arrays throughout the entire earth engineering apparatus.

23. An earth engineering apparatus as in claim 22, wherein:
said mating deformations comprise an inwardly directed deformation of one casing and a mating outwardly directed deformation of an adjacent contacting casing.

24. An earth engineering device comprising:
a plurality of vehicular tire casings arranged in a plurality of planar arrays extending in a substantially horizontal dimension, said planar arrays being layered on top of one another in a substantially vertical dimension whereby each of said casings is in contacting relationship with at least one other casing within its respective planar array and with at least one other casing within an adjacent layered planar array; and
means for integrally interconnecting said casings in both the vertical and horizontal dimensions, including plural horizontal connecting means distributed horizontally throughout each of said planar arrays positively locking the tire casings therein one to another at their points of respective contact within each such planar array and plural vertical connecting means distributed horizontally throughout the interface between each pair of adjacent vertically layered planar arrays positively locking one planar array to adjacent planar arrays throughout the entire earth engineering apparatus;
said horizontal and vertical connecting means comprising a plurality of slits in each casing at the contacting locations, and pins projecting through said slits to engage interior surfaces of the casings at said locations.

25. An earth engineering device comprising:
a plurality of vehicular tire casings arranged in a plurality of planar arrays extending in a substantially horizontal dimension, said planar arrays being layered on top of one another in a substantially vertical dimension whereby each of said casings is in contacting relationship with at least one other casing within its respective planar array and with at least one other casing within an adjacent layered planar array; and
means for integrally interconnecting said casings in both the vertical and horizontal dimensions, including plural horizontal connecting means distributed horizontally throughout each of said planar arrays positively locking the tire casings therein one to another at their points of respective contact within each such planar array and plural vertical connecting means distributed horizontally throughout the interface between each pair of adjacent vertically layered planar arrays positively locking one planar array to adjacent planar arrays throughout the entire earth engineering apparatus;
said horizontal and vertical connecting means comprising a slot in one of the casings at each contacting location and a tab formed in the other casing at each said location, said tab being in mating relationship and partially disposed within its respective slot.

26. An earth engineering device comprising:
a plurality of vehicular tire casings arranged in a plurality of planar arrays extending in a substantially horizontal dimension, said planar arrays being layered on top of one another in a substantially vertical dimension whereby each of said casings is in contacting relationship with at least one other casing within its respective planar array and with at least one other casing with an adjacent layered planar array; and
means for integrally interconnecting said casings in both the vertical and horizontal dimensions, including plural horizontal connecting means distributed horizontally throughout each of said planar arrays positively locking the tire casings therein one to another at their points of respective contact within each such planar array and plural vertical connecting means distributed horizontally throughout the interface between each pair of adjacent vertically layered planar arrays positively locking one planar array to adjacent planar arrays throughout the entire earth engineering apparatus;
said horizontal and vertical connecting means comprising double face gang nail plates interposed between the respective casings at said contacting locations, and nails associated with said plates to project through the casing at each of said locations.

* * * * *